US012383947B2

(12) United States Patent
Hüsgen et al.

(10) Patent No.: US 12,383,947 B2
(45) Date of Patent: Aug. 12, 2025

(54) METHOD FOR MONITORING AND FOR CHANGING THE POSITION OF AT LEAST ONE RUNNING BAR OF A METAL PRESS, AND METAL PRESS

(71) Applicant: SMS group GmbH, Düsseldorf (DE)

(72) Inventors: David Hüsgen, Korschenbroich (DE); Michael Büsch, Viersen (DE)

(73) Assignee: SMS group GmbH, Düsseldorf (DE)

( * ) Notice: Subject to any disclaimer, the term of this patent is extended or adjusted under 35 U.S.C. 154(b) by 370 days.

(21) Appl. No.: 18/031,043

(22) PCT Filed: Oct. 8, 2021

(86) PCT No.: PCT/EP2021/077879
§ 371 (c)(1),
(2) Date: May 5, 2023

(87) PCT Pub. No.: WO2022/078901
PCT Pub. Date: Apr. 21, 2022

(65) Prior Publication Data

US 2023/0372990 A1 Nov. 23, 2023

(30) Foreign Application Priority Data

Oct. 12, 2020 (DE) ..................... 10 2020 212 829.4

(51) Int. Cl.
*B21C 51/00* (2006.01)
*B21C 23/21* (2006.01)
(Continued)

(52) U.S. Cl.
CPC ............ *B21C 51/00* (2013.01); *B21C 23/215* (2013.01); *B21C 31/00* (2013.01); *B21J 9/20* (2013.01); *B21J 13/04* (2013.01); *B30B 15/041* (2013.01)

(58) Field of Classification Search
CPC ..... B21C 23/215; B21C 31/00; B30B 15/007; B30B 15/041; B21J 7/46; B21J 9/20; B21J 13/04
See application file for complete search history.

(56) References Cited

U.S. PATENT DOCUMENTS 5,421,181 A 6/1995 Ahrweiler et al.
6,259,110 B1 7/2001 Ettinger, Jr. et al.
(Continued)

FOREIGN PATENT DOCUMENTS

CN 201669364 U 12/2010
CN 107243586 A 10/2017
(Continued)

*Primary Examiner* — Jared O Brown
(74) *Attorney, Agent, or Firm* — Smartpat PLC

(57) ABSTRACT

A method for monitoring and changing the position of at least one component, more particularly a running bar, slidingly guided within a press frame between abutments of the press frame is disclosed. A central alignment of the component within the press frame is continuously measured and the alignment of the component within the press frame is corrected as a function of the acquired measurement result by preferably automatically adjustable guide elements of the sliding guides of the press. The central alignment of the slidingly guided component within the press frame is measured by the sensing of the location of at least one, preferably two, reference points of the slidingly guided component preferably in a plane extending perpendicularly to the longitudinal center axis of the press. A press having automatically adjustable guide elements and means for controlling the guide elements as a function of the measured position of the component.

18 Claims, 3 Drawing Sheets

(51) Int. Cl.

| | |
|---|---|
| ***B21C 31/00*** | (2006.01) |
| ***B21J 9/20*** | (2006.01) |
| ***B21J 13/04*** | (2006.01) |
| ***B30B 15/04*** | (2006.01) |

(56) References Cited

U.S. PATENT DOCUMENTS

| | | | | |
|---|---|---|---|---|
| 2004/0267472 | A1 * | 12/2004 | Jamison | B21C 23/212<br>702/95 |
| 2016/0107406 | A1 | 4/2016 | Schreiber et al. | |
| 2020/0197994 | A1 | 6/2020 | Galli et al. | |

FOREIGN PATENT DOCUMENTS

| | | | | |
|---|---|---|---|---|
| DE | 2850576 | A1 | 6/1980 | |
| DE | 3901961 | A1 | 8/1990 | |
| EP | 0379937 | A2 * | 8/1990 | B21C 23/212 |
| EP | 0379937 | B1 | 4/1994 | |
| EP | 0589240 | B1 | 4/1997 | |
| EP | 3003701 | A1 | 12/2014 | |
| EP | 3677356 | A1 * | 7/2020 | B21C 23/215 |
| EP | 3677356 | B1 | 10/2021 | |
| JP | S63132716 | A | 6/1988 | |
| JP | S63132716 | U | 6/1988 | |
| JP | H0265446 | A | 3/1990 | |
| JP | H0347619 | A | 2/1991 | |
| JP | H0414337 | U | 2/1992 | |
| JP | 2020099930 | A | 7/2020 | |

* cited by examiner

METHOD FOR MONITORING AND FOR CHANGING THE POSITION OF AT LEAST ONE RUNNING BAR OF A METAL PRESS, AND METAL PRESS

CROSS-REFERENCE TO RELATED APPLICATION

This application is a national stage application, filed under 35 U.S.C. § 371, of International Patent Application No. PCT/EP2021/077879, filed on 8 Oct. 2021, which claims the benefit of German Patent Application No. 10 2020 212 829.4, filed 12 Oct. 2020.

BACKGROUND

Extrusion presses usually operate in such a manner that a block to be extruded is pressed by a punch in the direction of a die (direct extrusion presses). In addition, extrusion presses with which a block transducer or transducer, as the case may be, with a metal block is pressed against a hollow pressing punch (indirect extrusion presses) are also common. Such presses comprise, for example, a press frame with one or more piston-cylinder units acting between a cylinder bar and a counter bar and applying the press force, along with a container holder and a running bar carrying a pressing punch. The runner bar and the container holder can be slid on guide columns of the press frame. In addition, these are provided with adjustable guide shoes, which have guide surfaces aligned with the main axis of the press. For trouble-free operation of such an extrusion press and for high dimensional accuracy of the wall thickness of the hollow sections produced, a central alignment of the container holder to the pressing tools is important.

DE 39 01 961 A1 describes a horizontal extrusion press with an axially displaceable container holder and running bar in the press frame between lower, weight-bearing guides and upper, hold-down guides. For the flush alignment of the container holder and the pressing tools, the container holder and the press frame are provided with adjustable guide shoes, which are resiliently connected to the container holder and the press frame by means of pressure elements and are held under the pressure force in positive-locking contact with the upper guides, wherein measuring sensors are provided between the container holder and the press frame for acquiring and indicating an inclination of the transducer axis. The measuring sensors are arranged on the upper, holding-down guide shoes to the container holder and to the running bar between the guide shoes and the container holder or running bar, as the case may be, carrying them, measuring and indicating the distance of the guide shoes to the container holder or running bar, as the case may be, parallel to the pressure elements, and the pressure elements are themselves designed as measuring sensors. In DE 39 01 961 A1, it is proposed that the measuring sensors be assigned measuring value indicators on the control stand of the press, which indicate any deviations that occur such that the operating personnel can recognize the extent of the deviations and, if necessary, carry out the corrections. Canting, asymmetrical thermal expansion or the like lead to a change in the distance between the end pieces of the container holder or the running bar and the sliding guides, such that the guide shoes are displaced under the effect of force from the disk spring assemblies provided on them. Although any angular and transverse deviations in the flush position of the transducer are reliably detected in this manner, detection takes place indirectly via the measuring sensors on the individual guide shoes, which makes automated monitoring and central alignment of the container holder along with the running bar of the press more difficult.

A generic method and such a press are also known from EP 3 677 356 A1.

Further prior art is known from documents EP 3 003 701 B1, CN 107243586 A, CN 201669364 U, JP 2020-99 930 A, U.S. Pat. No. 6,259,110 B1 and JP H04 141 337.

SUMMARY

The disclosure relates to a method for monitoring and changing at least one component, for example a running bar or a container holder, slidingly guided between abutments of a press frame within the press frame. The disclosure relates in particular to a method for monitoring the position and changing the position of at least one component slidingly guided within the press frame between abutments of a press frame, in particular of a running bar and/or container holder, wherein the method comprises continuously measuring a central alignment of the slidingly guided component within the press frame and correcting the alignment of the slidingly guided component within the press frame as a function of the acquired measurement result by means of adjustable guide elements of the sliding guides of the press.

The disclosure further relates to a press having a press frame and having cross bars that absorb the press forces when the press is in operation, at least one component that is slidingly guided within the press frame, in particular a slidingly guided running bar, slide and/or container holder, having sliding guides provided on the guide columns, and having adjustable guide elements of the sliding guides.

The disclosure is based on the object of providing a method, which enables relatively simple monitoring of the central alignment of the components movably guided in the main axis of the press and automatically correcting the central alignment of such components.

The object is achieved with the features of the method as claimed. The object is further achieved by a press as claimed. Advantageous variants of the invention are covered by the respective subclaims.

According to one aspect, a method for monitoring the position and changing the position of at least one component, in particular a running bar, slide and/or a container holder, slidingly guided within a press frame between abutments of a press frame, is provided, wherein the method comprises continuously measuring a central alignment of the slidingly guided component within the press frame and correcting the alignment of the slidingly guided component within the press frame as a function of the acquired measurement result by means of adjustable guide elements of the sliding guides of the press, characterized in that the central alignment of the slidingly guided component within the press frame is measured by sensing the location of two reference points of the slidingly guided component in a plane extending transversely to the longitudinal center axis of the press.

A slidingly guided component, the central alignment of which is to be monitored and corrected by the method in accordance with the disclosure, can be, for example, a running bar of a press. However, the method is not limited to this; rather, the central alignment of a container holder on a press can also be monitored, displayed to a plant operator and/or automatically corrected by a corresponding open-loop or closed-loop control. By measuring the position of the reference points, the central alignment or position of the slidingly guided component, as the case may be, relative to the main axis of the press or to the longitudinal center axis of the press, as the case may be, can be determined in an X-Y coordinate system. By comparing the target position with the actual position of the coordinates of the reference points, the required correction of the alignment of the slidingly guided component can be determined. The method can be used regardless of the number of columns or pressure sleeves, as the case may be. This makes it possible to monitor and/or change the position of a guided component of, for example, a 2-column or 4-column press.

The fact that the measuring arrangement preferably senses a position deviation ≤2 mm, preferably ≤0.5 mm, even more preferably ≤0.1 mm, makes it possible to correct even small deviations and thus improve the repeatability of the pressing process.

The method in accordance with the disclosure has the advantage that the reference points or reference markings, as the case may be, provided, for example, on the running bar of the press can be sensed optically and thus over a certain distance. The reference points are preferably arranged at two points as far apart from one another as possible around the longitudinal center axis of the press and preferably in a plane extending transversely to the longitudinal center axis of the press.

For example, markings that can be sensed by laser can be used as reference points. The sensing of position or sensing the location, as the case may be, of the reference points preferably takes place by means of at least one measuring arrangement provided on the press frame. For example, an image-processing sensor system can be considered as a measuring arrangement. This can additionally be equipped with a laser triangulator for the acquisition of depth information.

In an advantageous variant of the method, it is provided that the guide elements of the sliding guide are adjusted automatically as a function of the acquired measurement result.

Preferably, the number of adjustment processes and/or the adjustment path covered and/or the position data associated with each adjustment process is captured in an open-loop or closed-loop control device. The open-loop or closed-loop control device can primarily be designed to initiate an adjustment process on the guide elements of the sliding guide automatically, i.e. without prompting by the operator. However, the open-loop or closed-loop control device can also output corresponding information to the operator, who then initiates an adjustment process. In addition, as mentioned above, the open-loop or closed-loop control device can also output information about the wear condition of the sliding guide.

Preferably, the press reshapes metallic materials. With this application in particular, the machining forces that occur are high and the required tolerances of the finished press components are low. The changing of position reduces wear on the press and can compensate for deviations in order to maintain the required component tolerances.

Preferably, the method is used in open-die forging, closed-die forging, isothermal forging, ring blanking, deep-drawing, extrusion and/or piercing or drawing presses, as the case may be.

According to a further aspect a press is provided, having a press frame and, during operation of the press, cross bars that absorb the press forces, at least one component, in particular a running bar and/or a container holder, which is guided in a sliding manner on guide columns within the press frame, having sliding guides provided on the guide columns, and having preferably automatically adjustable guide elements of the sliding guide, wherein, in order to carry out the method described above, at least two reference points, which are arranged at a distance from one another and can preferably be sensed optically, are provided on the slidingly guided component or on the running bar, as the case may be, in a plane extending preferably transversely to the longitudinal center axis of the press, and wherein at least one measuring arrangement for sensing the location of the reference points is provided on the press frame.

The press frame of the press can have as abutments, for example, a cylinder bar and a counter bar, which can be connected to one another by tie rods. The press can be designed as a horizontal or vertical direct extrusion press or horizontal or vertical indirect extrusion press.

The invention is explained below with reference to an exemplary embodiment shown in the drawings.

DETAILED DESCRIPTION

Figure 1:
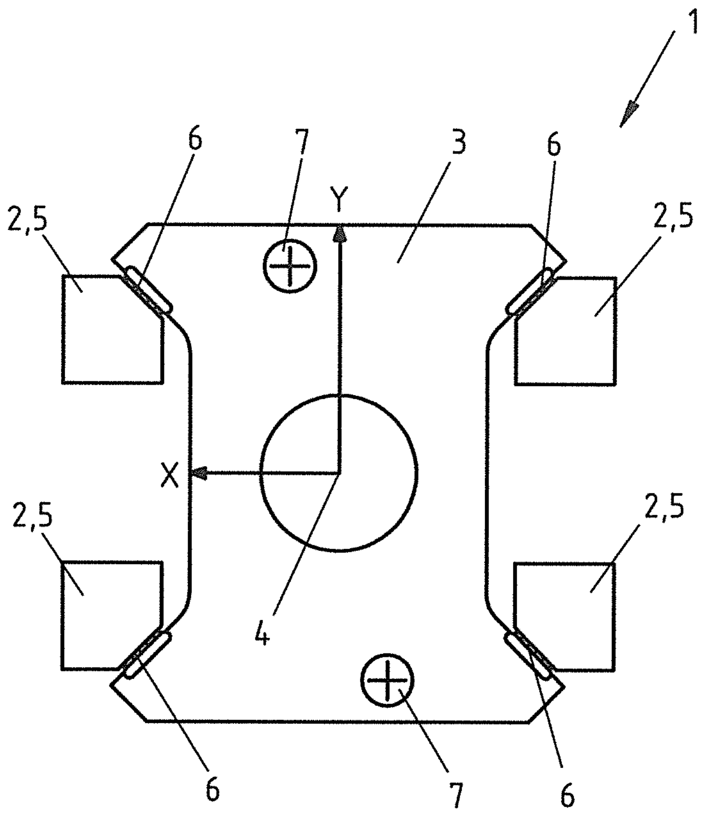
FIG. 1 shows a cross section through a metal press.
Figure 2:
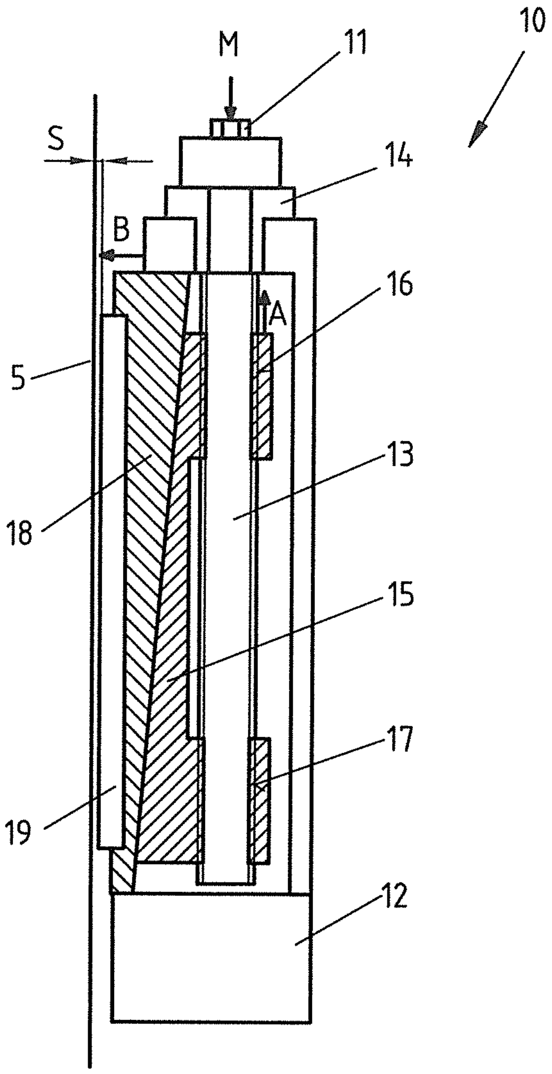
FIG. 2 shows a sectional view of an adjustable guide element on a press.
Figure 3:
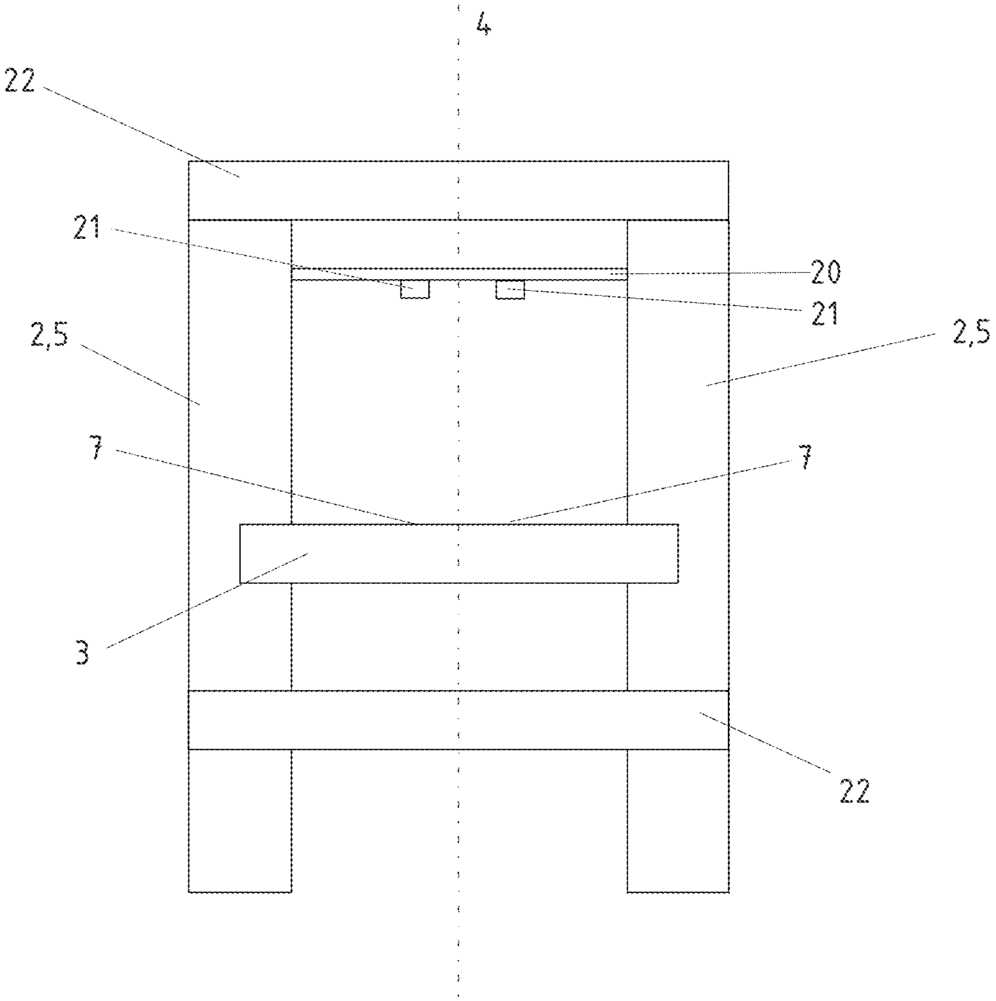
FIG. 3 schematically shows a side view of the metal press as in FIG. 1.

FIG. 1 shows a sectional view through a press 1 from the viewing direction of a measuring arrangement 20 arranged on a press frame 2 of the press 1. FIG. 3 schematically shows the press 1 in a side view. The measuring arrangement 20 is arranged between an upper bar or between a cylinder bar and a running bar 3 of the press 1, as the case may be. The running bar 3 is slidingly guided on guide columns 5 of the press frame 2 with respect to a longitudinal center axis 4 of the press 1, which extends into the drawing plane. For this purpose, correspondingly designed sliding guides 6 are provided on the running bar 3, which, as will be described below, have automatically adjustable guide elements 10. The position of the running bar 3 is constantly monitored by means of the measuring arrangement 20 provided on the press frame 2. The measuring arrangement 20 comprises laser sensors 21 that are aligned on a plane extending transversely to the longitudinal center axis 4 of the extrusion press 1 with reference points 7 arranged at a distance from the longitudinal center axis 4. The measuring arrangement 20 senses the position or reference points relative to the longitudinal center axis 4 of the extrusion press 1 in a coordinate system that is defined by the axes X and Y shown in FIG. 1. The reference points 7 are provided as optical markings on the running bar 3. The measuring arrangement 20 is coupled to the adjustable guide elements 10 via an open-loop or closed-loop control device. If, for example, a one-sided or asymmetrical wear of the sliding guides 6 should lead to a misalignment of the running bar 3, the measuring arrangement 20 senses a location change of the reference points 7 relative to the longitudinal center axis 4 of the press 1. The open-loop or closed-loop control device gives a corresponding control pulse to one or more guide elements 10, which cause a corresponding correction of the position of the running bar 3.

The guide element 10 comprises a housing 12, in which a spindle 13, which is rotatably mounted in a bushing 14, extends. The spindle 13 extends through first and second threaded bores 16, 17 of an adjusting wedge 15, which is displaceable within the housing 12 by rotating the spindle 13. The thread of the threaded bores 16, 17 is a movement thread complementary to the thread of the spindle 14. The adjusting wedge 15 rests against a guide wedge 18, which is connected to a sliding block 19 or a sliding plate, as the case may be. The sliding block 19, which forms part of the sliding guide 6, is designed as a wear part and is adjustable parallel to the longitudinal center axis 4 or the main axis, as the case may be, of the press 1.

At its end projecting from the housing 12, the spindle 13 is provided with a contact 11 for the drive axle of a drive unit (not shown). For example, a drive unit can be a direct-acting electric motor or consist of a motor with a gearbox. To change the position of the sliding block 19, the spindle 13 is rotated with a corresponding drive unit. The rotary movement causes the adjusting wedge 15 to slide in or against the direction of the drawn arrow A, thereby causing the guide wedge to slide in or against the direction of arrow B and either increasing or decreasing the distance S between the guide columns 5 and the sliding block 19.

LIST OF REFERENCE SIGNS

1 Extrusion press
2 Press frame
3 Running bar
4 Longitudinal center axis of the press
5 Guide columns
6 Sliding guide
7 Reference points
10 Guide element
11 Contact
12 Housing
13 Spindle
14 Bushing
15 Adjusting wedge
16 First threaded bore
17 Second threaded bore
18 Guide wedge
19 Sliding block
20 Measuring arrangement
21 Laser sensor
22 Cross bar
A Arrow
B Arrow
S Distance

The invention claimed is:

1. A method for monitoring and/or changing a position of a component that is slidingly guided between abutments within a press frame (2), the method comprising:
- continuously measuring a central alignment of the slidingly guided component within the press frame (2); and
- correcting the alignment of the slidingly guided component within the press frame (2) by automatically adjustable guide elements (10) of sliding guides of the press as a function of a measurement result acquired during the measuring,
- wherein the central alignment of the slidingly guided component within the press frame (2) is measured by sensing a location of two reference points (7) of the slidingly guided component in a plane extending transversely to a longitudinal center axis (4) of the press, and
- wherein the location of the reference points (7) is sensed by a measuring arrangement (20) provided on the press frame (2).

2. The method according to claim 1,
wherein the component is a running bar (3) and/or a container holder.

3. The method according to claim 1,
wherein the measuring arrangement comprises laser sensors, and the location of the reference points (7) is sensed by the laser sensors.

4. The method according to claim 1,
wherein the location of the reference points (7) is relative to the longitudinal center axis (4) of the press.

5. The method according to claim 1,
wherein the guide elements (10) of the sliding guide (6) are adjusted automatically as a function of the measurement result.

6. The method according to claim 1,
wherein
- a number of adjustment processes and/or
- an adjustment path covered and/or
- a position data associated with each adjustment process is/are captured in an open-loop or closed-loop control device.

7. The method according to claim 6,
wherein wear of the sliding guide (6) is determined from the number of adjustment processes and/or the adjustment path covered and is output to an operator of the press.

8. The method according to claim 1,
wherein the measuring arrangement senses a position deviation of ≤2 mm.

9. The method according to claim 1,
wherein the measuring arrangement senses a position deviation of ≤0.5 mm.

10. The method according to claim 1,
wherein the measuring arrangement senses a position deviation of ≤0.1 mm.

11. The method according to claim 1,
wherein the press reshapes metallic materials.

12. The method according to claim 1,
wherein the press open-die forges, closed-die forges, isothermal forges, produces ring blanks, deep-draws, extrudes and/or presses pierced and drawn components.

13. A press, comprising:
- a press frame (2);
- cross bars configured to absorb press forces during operation of the press;
- a component (3), the component being slidingly guided on guide columns (5) within the press frame;
- sliding guides (6) provided on the guide columns (5) and/or in engagement with the guide columns (5); and
- automatically adjustable guide elements (10) of the sliding guides (5);
- at least two reference points (7) arranged at a distance from one another and provided on the component in a plane extending transversely to a longitudinal center axis (4) of the press; and
- a measuring arrangement (20) arranged on the press frame (2) and configured for optically sensing a location of the reference points (7).

14. The press according to claim 13,
wherein the component is a running bar (3) or a container holder.

15. The press according to claim 13,
wherein the measuring arrangement (20) is coupled to the adjustable guide elements (10) via an open-loop or closed-loop control device in such a manner that a control signal for controlling the automatically adjustable guide elements (10) can be generated from measuring signals acquired by the measuring arrangement (20), such that correcting an alignment of the slidingly guided component within the press frame (2) can be effected automatically as a function of the acquired measurement signals.

16. The press according to claim 13, wherein at least one of the automatically adjustable guide elements (10) comprises a sliding block (19) adjustable transversely to a direction of movement of the slidingly guided component of the press, an adjusting wedge (15) and a guide wedge (18), the adjustment of which relative to one another causes a displacement of the sliding block (19) transversely to the direction of movement of the slidingly guided component, and wherein the adjusting wedge (15) is continuously adjustable by a spindle drive.

17. The press according to claim 13, wherein the press is configured for forming metallic materials.

18. The press according to claim 13, wherein the press is configured for open-die forging, closed-die forging, isothermal forging, ring blanking, piercing or drawing, deep-drawing, or extrusion pressing.

* * * * *